United States Patent
Lin et al.

(10) Patent No.: US 9,323,293 B2
(45) Date of Patent: Apr. 26, 2016

(54) ELECTRONIC DEVICE AND POWER CONTROL METHOD THEREOF

(75) Inventors: Kai-Chen Lin, New Taipei (TW); Chang-Ming Lee, New Taipei (TW); Chung-Hsin Shen, New Taipei (TW); Shao-Huai Tsai, New Taipei (TW); Yao-Te Tsai, New Taipei (TW); Chun-Chieh Huang, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 1057 days.

(21) Appl. No.: 13/439,856

(22) Filed: Apr. 5, 2012

(65) Prior Publication Data
US 2012/0299394 A1 Nov. 29, 2012

(30) Foreign Application Priority Data
May 27, 2011 (TW) .............................. 100118617 A

(51) Int. Cl.
*H01H 83/00* (2006.01)
*G06F 1/16* (2006.01)
*G06F 1/32* (2006.01)

(52) U.S. Cl.
CPC ............ *G06F 1/1677* (2013.01); *G06F 1/1681* (2013.01); *G06F 1/3206* (2013.01); *Y10T 307/766* (2015.04)

(58) Field of Classification Search
CPC .. Y10T 307/766; G06F 1/1677; G06F 1/1681
USPC ...................................... 307/116; 361/679.55
See application file for complete search history.

(56) References Cited

U.S. PATENT DOCUMENTS

| | | | | |
|---|---|---|---|---|
| 6,122,152 A | * | 9/2000 | Goto et al. | 361/1 |
| 7,261,331 B2 | * | 8/2007 | Lin | 292/116 |
| 7,370,218 B2 | * | 5/2008 | Lee | 713/320 |
| 7,477,508 B1 | * | 1/2009 | Pilkington et al. | 361/679.09 |
| 7,490,874 B2 | * | 2/2009 | Chen | 292/214 |
| 8,174,837 B2 | * | 5/2012 | Tracy et al. | 361/747 |
| 8,184,433 B2 | | 5/2012 | Lin | |
| 2003/0151888 A1 | * | 8/2003 | Chien et al. | 361/680 |
| 2011/0090644 A1 | * | 4/2011 | Lin | 361/679.55 |

FOREIGN PATENT DOCUMENTS

TW M380697 5/2010

OTHER PUBLICATIONS

Office action mailed on Jun. 18, 2014 for the China application No. 201110157147.8, p. 3-4, p. 5 line 7-28 and p. 6-12.
Office action mailed on Dec. 25, 2013 for the Taiwan application No. 100118617, filing date: May 27, 2011, p. 1 line 1-14 and p. 2-7.

* cited by examiner

*Primary Examiner* — Jared Fureman
*Assistant Examiner* — Alfonso Perez Borroto
(74) *Attorney, Agent, or Firm* — Winston Hsu; Scott Margo

(57) ABSTRACT

An electronic device includes a first module including a first conductive component and a power control unit coupled to the first conductive component. The electronic device further includes a second module, a first hinge for pivoting the second module relative to the first module, and a first arm connected to the first hinge. The power control unit controls whether to execute a first power management status according to whether the first arm contacts the first conductive component as the second module pivots relative to the first module at a first angle by the first hinge.

18 Claims, 7 Drawing Sheets

ELECTRONIC DEVICE AND POWER CONTROL METHOD THEREOF

BACKGROUND OF THE INVENTION

1. Field of the Invention

The present invention relates to an electronic device and a power control method thereof, and more particularly, to an electronic device capable of controlling power status by adjusting rotating angles of the hinges and a power control method thereof.

2. Description of the Prior Art

Recently, a computer has become one of the most important tools for dealing with information in modern society. Frequencies of an operating clock of a desktop computer, a notebook computer or a server is getting higher and higher, and application thereof is getting wider and wider. According to specifications of Advanced Configuration and Power Interface (ACPI) and according to power consumption status of the computer, the computer can be operated in statuses of S0, S1, S2, S3, S4 and S5. Further, the statuses of S1, S2 and S3 are powering-on statuses, and the main difference therebetween is operating clocks of a processor and statuses of power on/off. The status of S3 is a stand-by status, that is, the computer will keep all information Suspend To RAM (STR). The status of S4 is a sleeping status, that is, the computer has to terminate current programs and resident programs, and to keep current configuration Suspend To Disk (STD). The status of S4 is a power initialization status, that is, the computer will turn off all non-critical system power. Generally speaking, a conventional power management adopts software control or a power button to switch the power consumption statuses. However, it might damage the computer if turning-off process does not go well or if a user forgets to press the power button, after closing an upper casing and a lower casing of the notebook computer. As a result, it not only damages the computer, but also decreases life of components thereof.

SUMMARY OF THE INVENTION

Thus, the present invention provides an electronic device capable of controlling power status by adjusting rotating angles of the hinges and a power control method thereof for solving above drawbacks.

According to the claimed invention, an electronic device includes a first module including a first conductive component and a power control unit coupled to the first conductive component, a second module, a first hinge for pivoting the second module relative to the first module, and a first arm connected to the first hinge, the power control unit controlling whether to execute a first power management status according to whether the first arm contacts the first conductive component as the second module pivots relative to the first module at a first angle by the first hinge.

According to the claimed invention, a power control method includes determining whether a first arm connected to the first hinge contacts a first conductive component of the first module when the first hinge pivots the second module relative to the first module at a first angle; and controlling whether the electronic device executes a first power management status according to whether the first arm contacts the first conductive component.

In summary, the present invention can control power management statuses by adjusting pivoting angles of the first module relative to the second module. For example, the present invention can force the operation executed by a system implemented in the electronic device to be powering-off completely or partly as second module of the electronic device pivots relative to the first module, so as to prevent the system from being damaged. In such a manner, the present invention can not only avoid power consumption, but also avoid the system in the electronic device from being damaged. Furthermore, since the present invention utilizes a switch driven by the hinges instead of disposing a power button, it can omit pressing motion for the power button when powering on the electronic device. Accordingly, it can accelerate the powering-on process of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
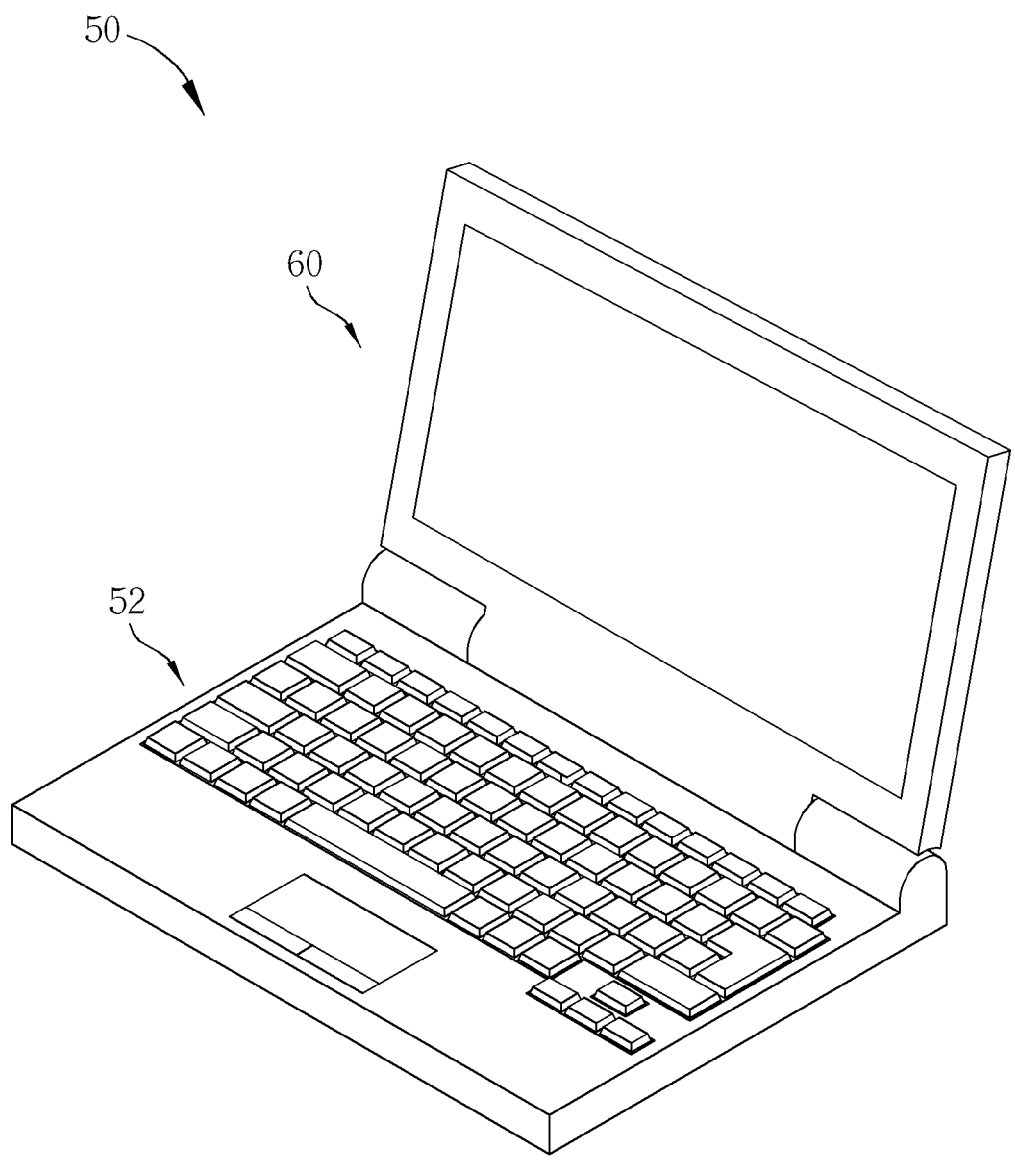
FIG. 1 is a schematic diagram of an electronic device according to an embodiment of the present invention.
Figure 2:
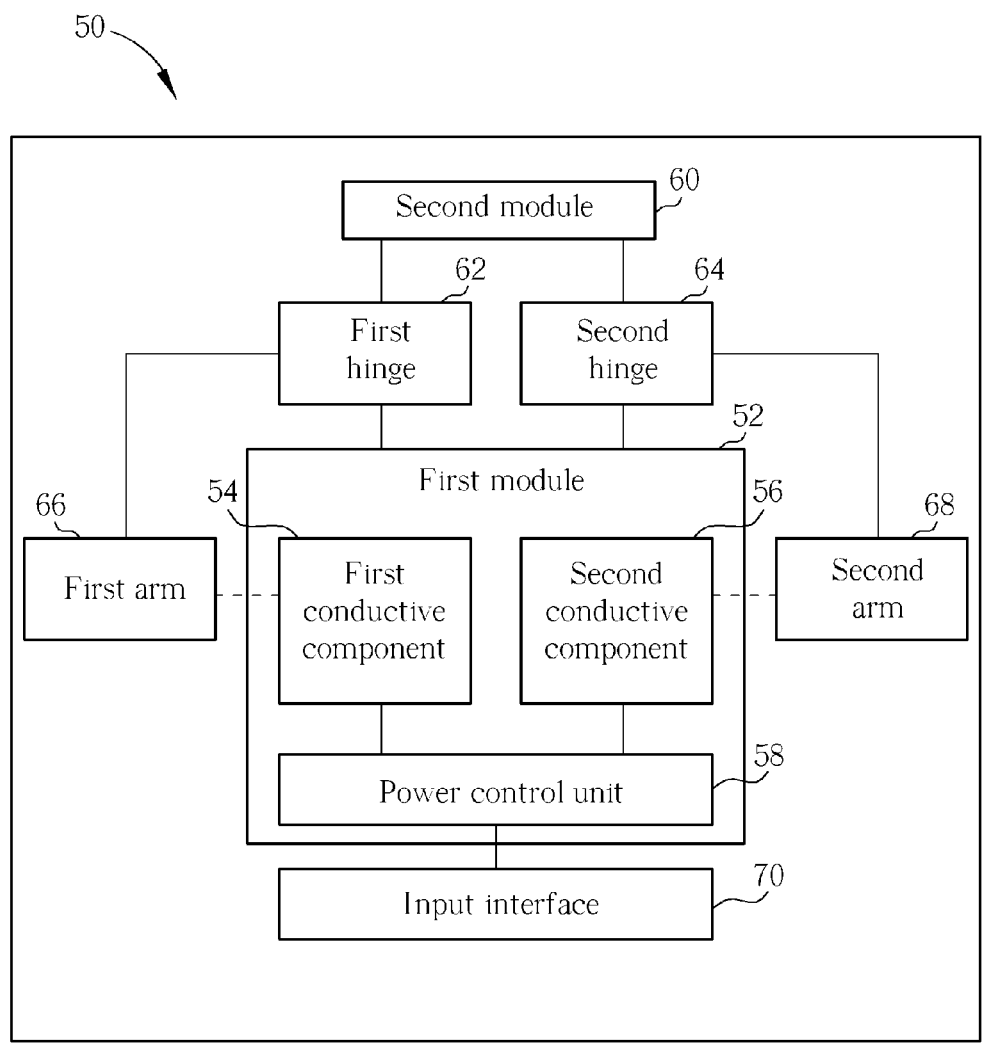
FIG. 2 is a functional block diagram of the electronic device according to the embodiment of the present invention.
Figure 3:
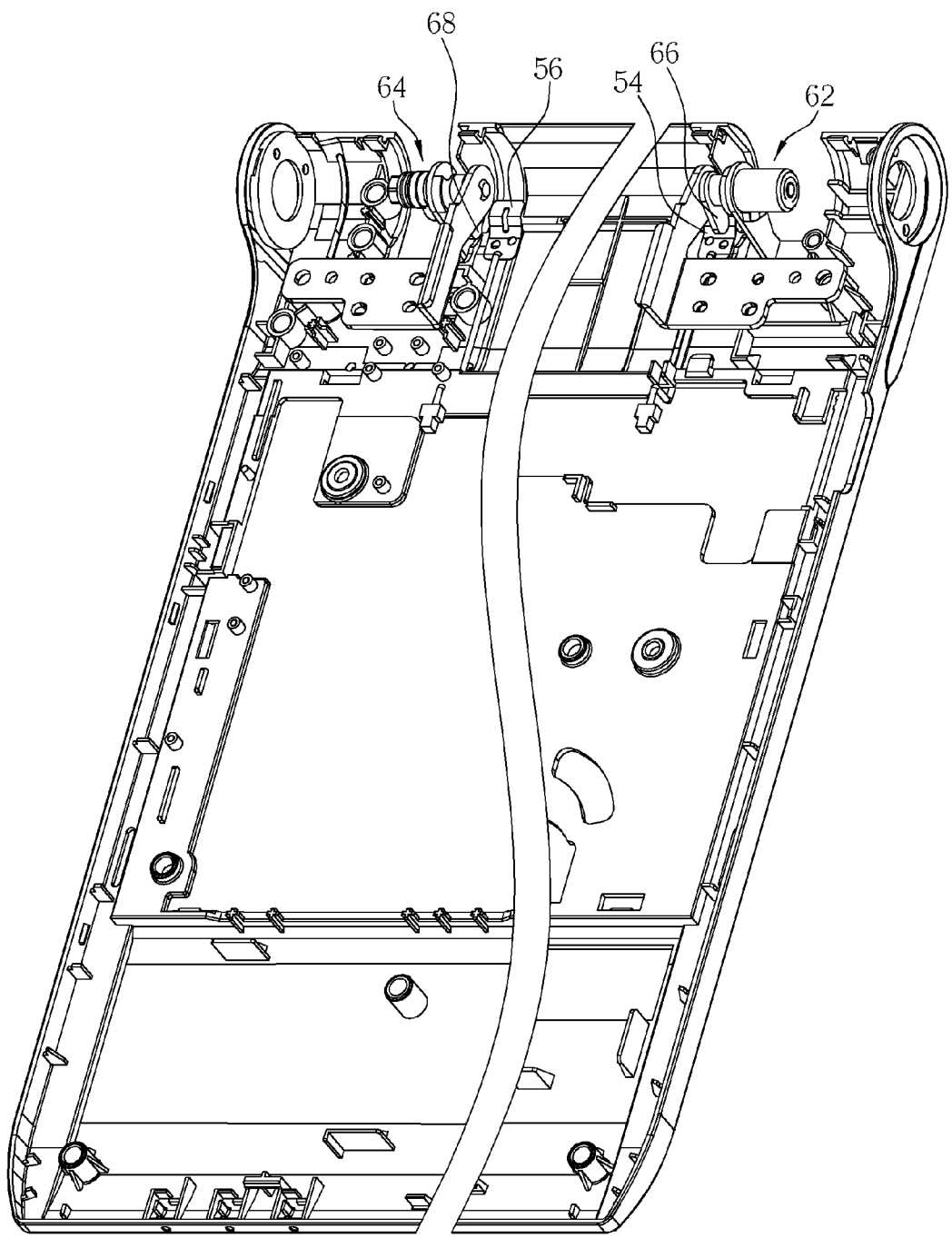
FIG. 3 is an internal structure diagram of the electronic device according to the embodiment of the present invention.
Figure 4:
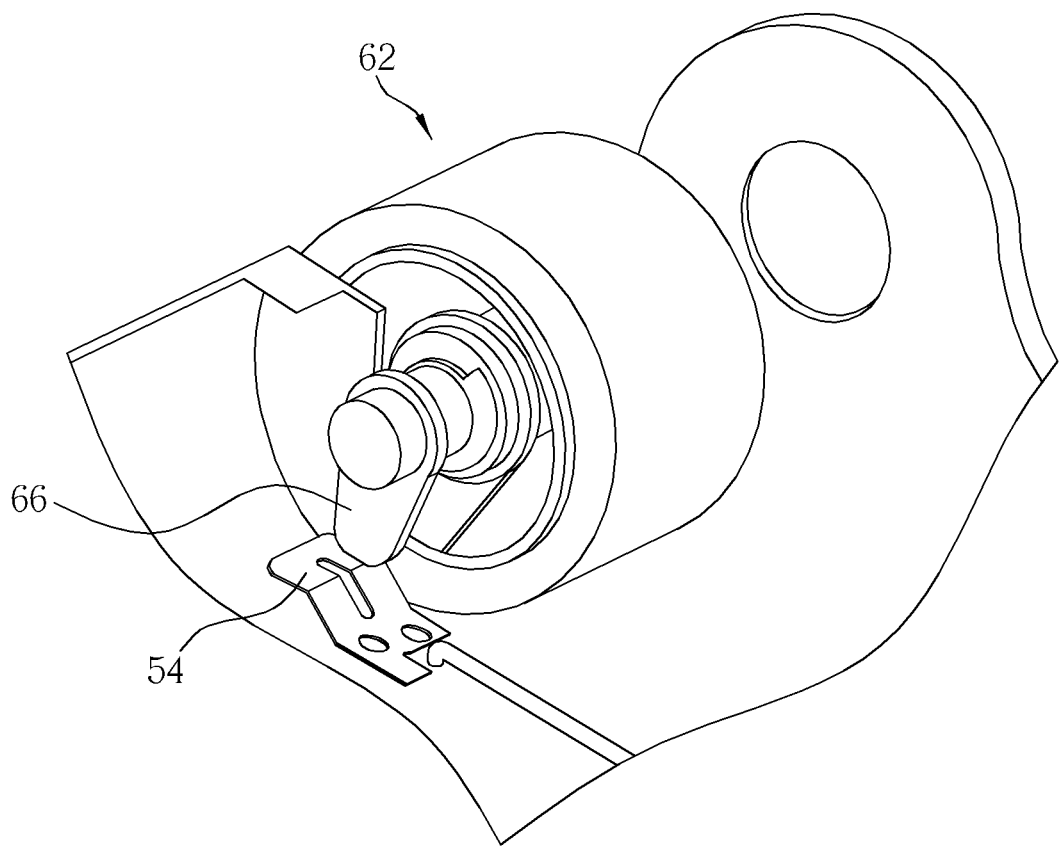
FIG. 4 and FIG. 5 are respectively partially enlarged diagrams of a first hinge and a second hinge according to the embodiment of the present invention.
Figure 5:
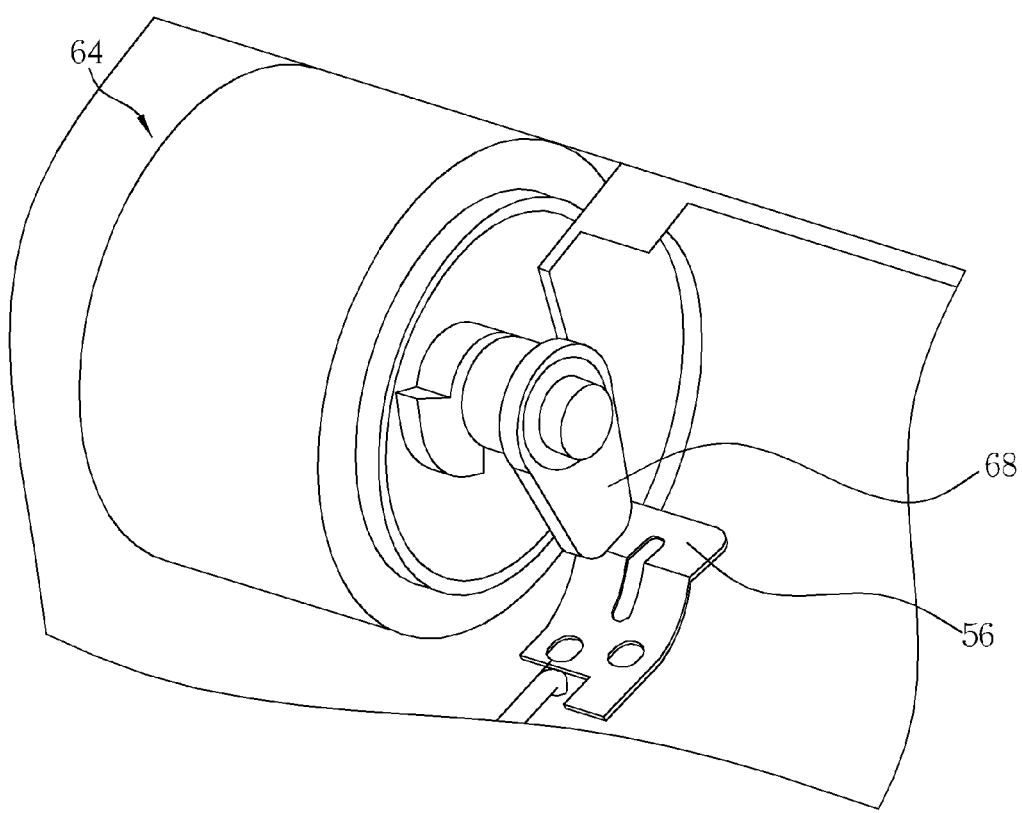

Please refer to FIG. 1 to FIG. 3. FIG. 1 is a schematic diagram of an electronic device 50 according to an embodiment of the present invention. FIG. 2 is a functional block diagram of the electronic device 50 according to the embodiment of the present invention. FIG. 3 is an internal structure diagram of the electronic device 50 according to the embodiment of the present invention. The electronic device 50 can be a portable computer device, such as a notebook computer and so on. The electronic device 50 includes a first module 52. The first module 52 can be a host module and includes a first conductive component 54 and a second conductive component 56. The first conductive component 54 and the second conductive component 56 can be conductive clips, respectively. The first module 52 further includes a power control unit 58 coupled to the first conductive component 54 and the second conductive component 56 for controlling power management statuses of the electronic device 50, such as power consumption statuses S0, S1, S2, S3, S4 and S5 according to specifications of advanced configuration and power interface (ACPI). Furthermore, the power control unit 58 is for controlling a power supply to supply different operating voltages according to different system statuses, such as a powering-on status, a stand-by status, a sleeping status, a powering-off status and so on. The electronic device 50 further includes a second module 60 pivoted to the first module 52. The second module 60 can be a display module. The electronic device 50 further includes a first hinge 62 and a second hinge 64 for cooperatively pivoting the second module 60 relative to the first module 52. In addition, please refer to FIG. 3 to FIG. 5. FIG. 4 and FIG. 5 are respectively partially enlarged diagrams of the first hinge 62 and the second hinge 64 according to the embodiment of the present invention. The electronic device 50 further includes a first arm 66 and a second arm 68. The first arm 66 and the second arm 68 are respectively connected to the first hinge 62 and the second hinge 64 for pivoting cooperatively with the first hinge 62 and the second hinge 64. The electronic device 50 further includes an input interface 70 for inputting a first activating signal and a second activating signal to the power control unit 58. In this embodiment, the input interface 70 can be performed by hardware such as an operating button or by software such as a application program.

Figure 6:
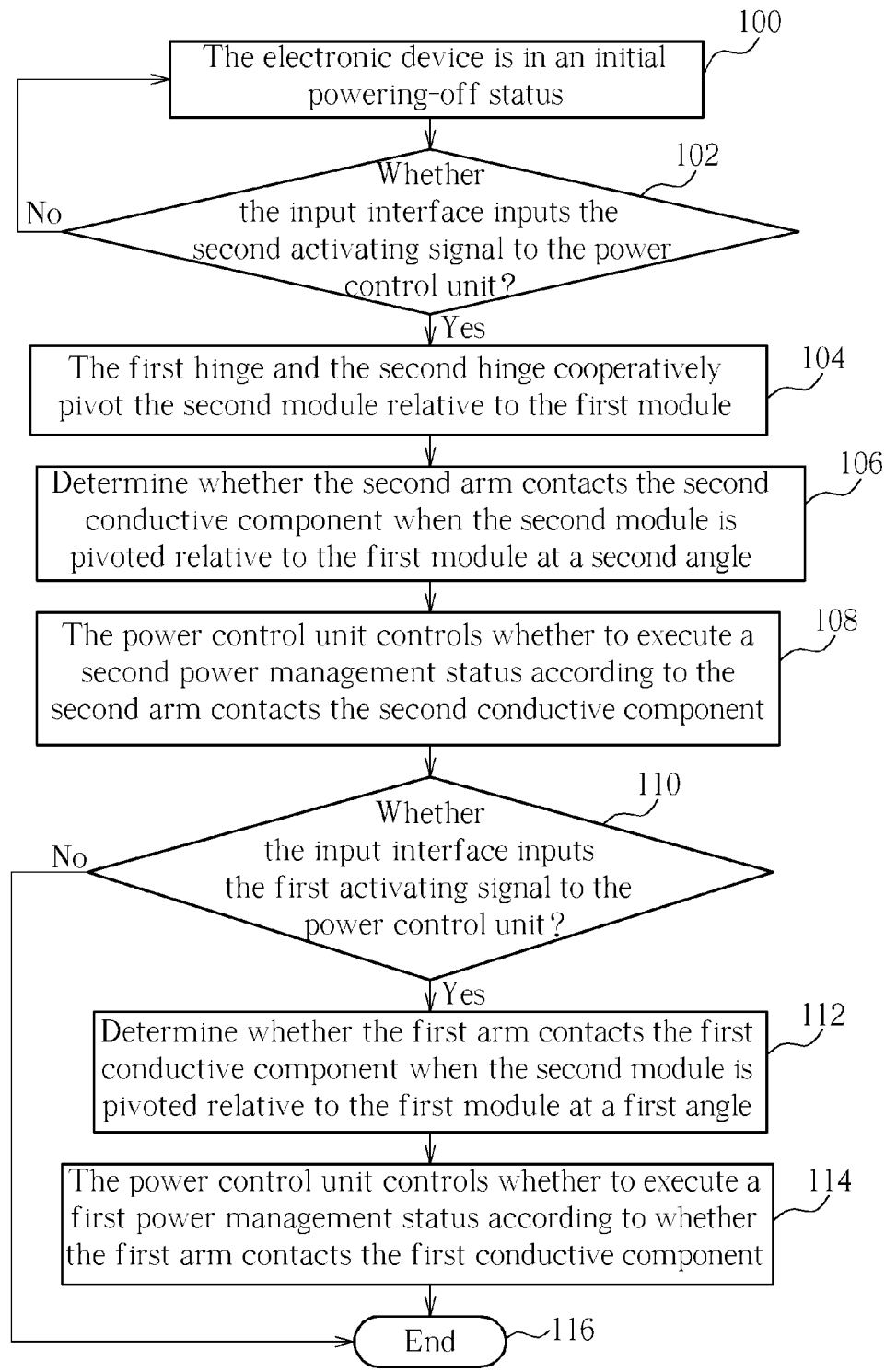
FIG. 6 is a flow chart illustrating the electronic device is pivoted by the hinges to execute powering-on operation according to the embodiment of the present invention.

Please refer to FIG. 6. FIG. 6 is a flow chart illustrating the electronic device 50 is pivoted by the hinges to execute powering-on operation according to the embodiment of the present invention. The flow chart includes steps of:

Step 100: The electronic device 50 is in an initial powering-off status.

Step 102: Determine whether the input interface 70 inputs the second activating signal to the power control unit 58. If yes, execute Step 104; if no, go to Step 100.

Step 104: The first hinge 62 and the second hinge 64 cooperatively pivot the second module 60 relative to the first module 52.

Step 106: Determine whether the second arm 68 contacts the second conductive component 56 when the second module 60 is pivoted relative to the first module 52 at a second angle.

Step 108: The power control unit 58 controls whether to execute a second power management status according to the second arm 68 contacts the second conductive component 56.

Step 110: Determine whether the input interface 70 inputs the first activating signal to the power control unit 58. If yes, execute Step 112; if no, go to Step 116.

Step 112: Determine whether the first arm 66 contacts the first conductive component 54 when the second module 60 is pivoted relative to the first module 52 at a first angle.

Step 114: The power control unit 58 controls whether to execute a first power management status according to whether the first arm 66 contacts the first conductive component 54.

Step 116: End.

More detailed description for the above-mentioned steps is provided as follows. The present invention provides a power control method which controls the power management statuses by adjusting pivoting angles of the hinges. In this embodiment, motion of the first hinge 62 and the first arm 66 activates or turns off the first power management status, and motion of the second hinge 64 and the second arm 68 activates or turns off the second power management status. The first power management status can turn on/off the machine, and the second power management status can be an initialized power status (S5 status). The first power management status and the second power management status are not limited to those mentioned above, and it depends on practical demands. Furthermore, whether the aforesaid functions are executed by the electronic device 50 is determined according to the first activating signal and the second activating signal input by the input interface 70. In addition, the present invention can only utilize the first hinge 62 and the first arm 66 to activate the first power management status, or can only utilize the second hinge 64 and the second arm 68 to activate the second power management status. It depends on practical demands.

As shown in FIG. 6, at first, the electronic device 50 is in the initial powering-off status. When the process of turning on the machine is performed, the second module 60 can be lifted to open relative to the first module 52, so that the first hinge 62 and the second hinge 64 can cooperatively pivot the second module 60 relative to the first module 52. If it is desired to utilize the second hinge 64 and the second arm 68 to activate the second power management status, the second activating signal corresponding to enable operation is input from the input interface 70 to the power control unit 58. For example, the second activating signal can be output by a keyboard or a keyboard controller. On the other hand, if it is not desired to utilize the second hinge 64 and the second arm 68 to activate the second power management status, the second activating signal corresponding to disable operation is input from the input interface 70 to the power control unit 58. In such a manner, the following motions of the second hinge 64 and the second arm 68 will not affect the power management statuses of the electronic device 50. In other words, as long as the electronic device 50 is connected to an external power source, the system will be supplied by the external power source. In this embodiment, determining whether to activate the pivotal control mechanism according to the second activating signal can be omitted, and it depends on practical demands.

In a situation of driving the second hinge 64 and the second arm 68 to pivot for switching the second power management status, the second arm 68 can be designed to contact the second conductive component 56 when the first hinge 62 and the second hinge 64 cooperatively pivot the second module 60 relative to the first module 52 at an angle smaller than the second angle, e.g. the second angle can be 30 degrees. The power control unit 58 does not execute the second power management status when the second arm 68 contacts the second conductive component 56. The second arm 68 separates from the second conductive component 56 when the first hinge 62 and the second hinge 64 cooperatively pivot the second module 60 relative to the first module 52 at an angle greater than the second angle, and the power control unit 58 executes the second power management status when the second arm 68 separates from the second conductive component 56. In other words, the power control unit 58 will execute the second power management status when the second activating signal activates the pivotal control mechanism and the second arm 68 separates from the second conductive component 56 simultaneously. The above mechanism can be performed by an AND circuit. For example, when the angle included between the first module 52 and the second module 60 is smaller than the second angle, the second arm 68 continues contacting the second conductive component 56. In the meanwhile, a signal input to the power control unit 58 can be switched to a low voltage level. On the other hand, when the angle included between the first module 52 and the second module 60 is greater than the second angle, the second arm 68 will not contact the second conductive component 56. In the meanwhile, the signal input to the power control unit 58 can be switched to a high voltage level. At the same time, if the power control unit 58 receives the second activating signal with the high voltage level, the signal can be transmitted to a control circuit for controlling the power management status, i.e. the second power management status. In addition, the aforesaid control mechanism can be coupled to the keyboard controller. When the electronic device 50 is coupled to the external power source, the keyboard controller will input the corresponding activating signal and performs AND judgment cooperatively with the above-mentioned mechanism. In other words, the system will activate the initialized power status (S5 status) when the signal input to the power control unit 58 is at the high voltage level, the power control unit 58 receives the second activating signal with the high voltage corresponding to powering-on operation, when the keyboard controller inputs the corresponding activating signal.

Furthermore, if it is desired to pivot the first hinge 62 and the first arm 66 for controlling the first power management status, the input interface 70 can be used for inputting the first activating signal corresponding to enable operation to the power control unit 58. For example, the first activating signal can be output by the keyboard and the keyboard controller. On the other hand, if it is not desired to pivot the first hinge 62 and the first arm 66 for activating the first power management status, the input interface 70 can be used for inputting the first activating signal corresponding to disable operation to the power control unit 58. In such a manner, the following motion of the first hinge 62 and the first arm 66 will not affect the power management status of the electronic device 50. In this embodiment, mechanism for activating pivotal control mechanism can be omitted, and it depends on practical demands.

In a situation of driving the first hinge 62 and the first arm 66 to pivot for switching the first power management status, the first arm 66 can be designed not to contact the first conductive component 54 when the first hinge 62 and the second hinge 64 cooperatively pivot the second module 60 relative to the first module 52 at an angle smaller than the first angle, e.g. the first angle can be 60 degrees. The power control unit 58 does not execute the first power management status when the first arm 66 does not contact the first conductive component 54, and the power control unit 58 does not execute the first power management status when the first arm 66 does not contact the first conductive component 54. The first arm 66 contacts the first conductive component 54 when the first hinge 62 and the second hinge 64 cooperatively pivot the second module 60 relative to the first module 52 at the first angle, and the power control unit 58 executes the first power management status when the first arm 66 contacts the first conductive component 54. In other words, the power control unit 58 will execute the first power management status when the first activating signal activates the pivotal control mechanism and the first arm 66 contacts the first conductive component 54 simultaneously. The above mechanism can be performed by the AND circuit. For example, when the angle included between the first module 52 and the second module 60 is smaller than the first angle, the first arm 66 can not contact the first conductive component 54. In the meanwhile, the above situation is identical to that the power button is not pressed, and the signal input to the power control unit 58 can be at the low voltage level. On the other hand, when the second module 60 is pivoted relative to the first module 52 at the first angle, the first arm 66 will contact the first conductive component 54. In the meanwhile, the signal input to the power control unit 58 can be at the high voltage level. The above situation is identical to that the power button is pressed to perform powering-on process, i.e. the first management power status. In this embodiment, the second angle is smaller than the first angle for determining whether to execute the initialized power status (S5 status) first and then determining whether to execute the powering-on process when the second module 60 is opened relative to the first module 52. In other words, when the angle included between the first module 52 and the second module 60 is smaller than the first angle and greater than the second angle, the electronic device 50 activates the initialized power status without executing the powering-on process. When the angle included between the first module 52 and the second module 60 is greater than the first angle, the electronic device 50 has activated the initialized power status and executes the powering-on process.

Figure 7:
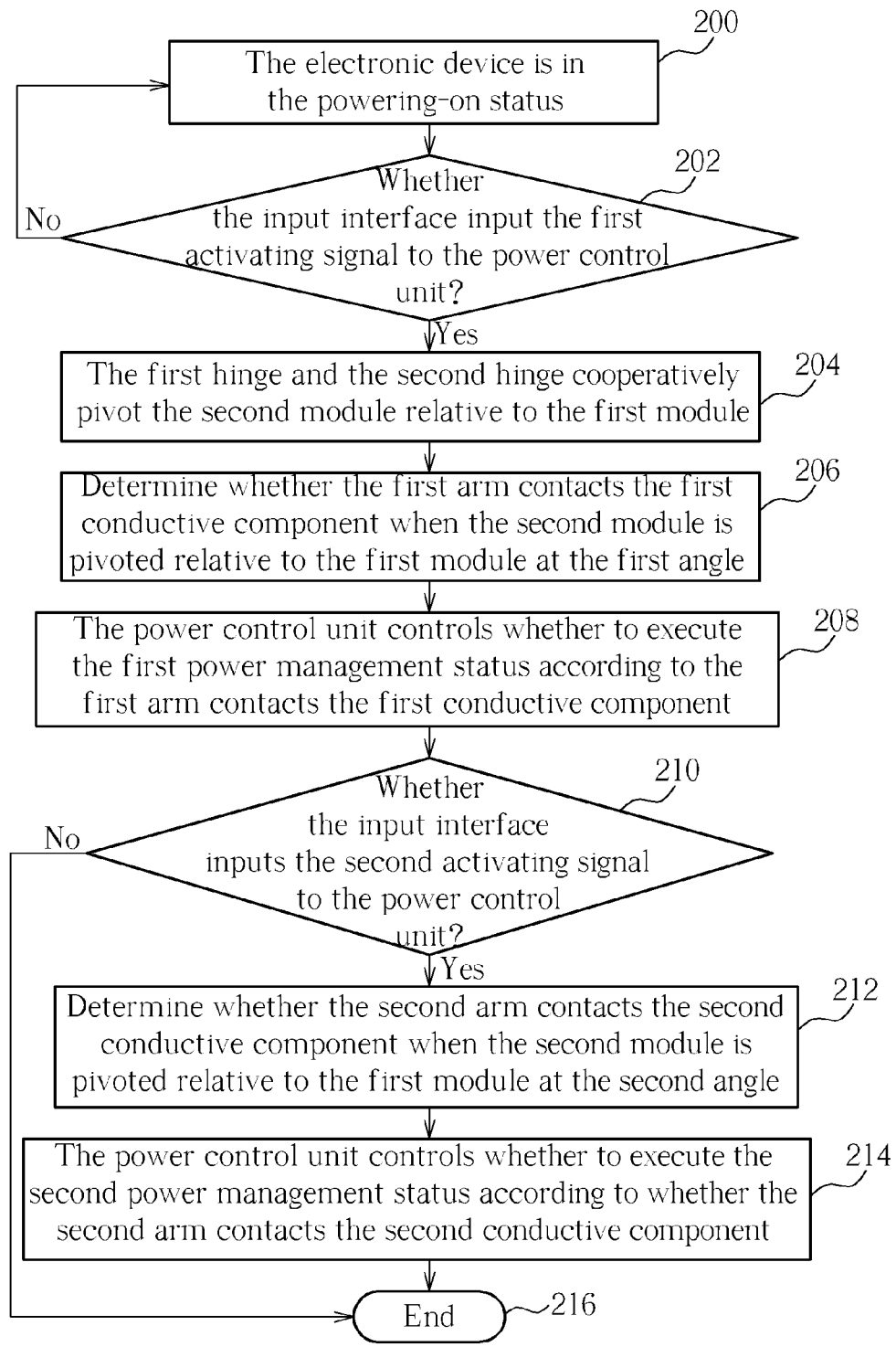
FIG. 7 is a flow chart illustrating the electronic device is pivoted by the hinges to execute powering-off operation according to the embodiment of the present invention.

Please refer to FIG. 7. FIG. 7 is a flow chart illustrating the electronic device 50 is pivoted by the hinges to execute powering-off operation according to the embodiment of the present invention. The flow chart includes steps of:

Step 200: The electronic device 50 is in the powering-on status.

Step 202: Determine whether the input interface 70 input the first activating signal to the power control unit 58. If yes, forward to Step 204; if no, backward to Step 200.

Step 204: The first hinge 62 and the second hinge 64 cooperatively pivot the second module 60 relative to the first module 52.

Step 206: Determine whether the first arm 66 contacts the first conductive component 54 when the second module 60 is pivoted relative to the first module 52 at the first angle.

Step 208: The power control unit 58 controls whether to execute the first power management status according to the first arm 66 contacts the first conductive component 54.

Step 210: Determine whether the input interface 70 inputs the second activating signal to the power control unit 58. If yes, forward to Step 212; if no, jump to Step 216.

Step 212: Determine whether the second arm 68 contacts the second conductive component 56 when the second module 60 is pivoted relative to the first module 52 at the second angle.

Step 214: The power control unit 58 controls whether to execute the second power management status according to whether the second arm 68 contacts the second conductive component 56.

Step 216: End.

The flow illustrating the electronic device 50 executes powering-off operation is similar to the flow illustrating the electronic device 50 executes powering-on operation. The more detailed description is provided as follows. As shown in FIG. 7, at first, the electronic device 50 is in the powering-on status. When the process of turning off the machine is performed, the second module 60 can be closed relative to the first module 52, so that the first hinge 62 and the second hinge 64 can cooperatively pivot the second module 60 relative to the first module 52. Similarly, if it is desired to utilize the first hinge 62 and the first arm 66 to turn off the first power management status, the second activating signal corresponding to enable operation is input from the input interface 70 to the power control unit 58. For example, the first activating signal can be output by the keyboard or the keyboard controller. On the other hand, if it is not desired to utilize the first hinge 62 and the first arm 66 to activated the first power management status, the first activating signal corresponding to disable operation is input from the input interface 70 to the power control unit 58. In such a manner, the following motions of the first hinge 62 and the first arm 66 will not affect the power management statuses of the electronic device 50. In this embodiment, determining whether to turn on the pivotal control mechanism according to the first activating signal can be omitted, and it depends on practical demands.

Similar to the powering-on operation, in a situation of driving the first hinge 62 and the first arm 66 to pivot for switching the first power management status, the first arm 66 can be designed to contact the first conductive component 54 when the first hinge 62 and the second hinge 64 cooperatively pivot the second module 60 relative to the first module 52 at the first angle, e.g. the first angle can be 60 degrees. At the same time, the situation is identical to that the power button is pressed for executing the powering-off process. Next, if it is desired to pivot the second hinge 64 and the second arm 68 for switching the second power management status, the input interface 70 is for inputting the second activating signal corresponding to power on to the power control unit 58. For example, the second activating signal can be output by the keyboard and the keyboard controller. On the other hand, if it is not desired the second hinge 64 and the second arm 68 to pivot for activating the first power management status, the input interface 70 is for inputting the second activating signal corresponding to power off to the power control unit 58. In such a manner, the following motion of the second hinge 64 and the second arm 68 will not affect the power management status of the electronic device 50.

Furthermore, in a situation of driving the second hinge 64 and the second arm 68 to pivot for switching the second power management status, the second arm 68 can be designed not to contact the second conductive component 56 when the first hinge 62 and the second hinge 64 cooperatively pivot the second module 60 relative to the first module 52 at an angle smaller than the second angle, e.g. the first angle can be 30 degrees. At the same time, the power control unit 58 continues to execute the powering-off process of the initialized power status. In addition, in order to prevent the system from turning off the initialized power status too rapidly when the electronic device 50 is closed, the initialized power status will be turned off after completing the powering-off operation and after the signal of the keyboard controller is de-activated. In other words, although the powering-off process is executed by the process that the second module 60 being closed relative to the first module 52, the system will not turn off the power immediately when the second module 60 is closed relative to the first module 52. Instead, the system will turn off the initialized power status (S5 power source) after the powering-off process is exactly performed. Furthermore, the power path is broken out not only for avoiding the system from being supplied improperly, but also avoid the system from being damaged. As known above, the present invention can separate the initialized power sources by the second hinge 64 and the second arm 68 in order to save more the system initialized power when the electronic device 50 is coupled to the external power source, so as to achieve effect of power-saving.

Compared with the prior art, the present invention can control power management statuses by adjusting pivoting angles of the first module relative to the second module, so as to prevent the system from being damaged due to continuous operation as the second module is close relative to the first module. In such a manner, the present invention can not only avoid power consumption, but also enhance service life and stability of components. Furthermore, since the present invention utilizes a switch driven by the hinges instead of disposing the power button, it can omit pressing motion for the power button when powering on the electronic device. Accordingly, it can accelerate the powering-on process of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
    a first module comprising a first conductive component, a second conductive component and a power control unit, the power control unit being coupled to the first conductive component and the second conductive component;
    a second module;
    a first hinge for pivoting the second module relative to the first module;
    a first arm connected to the first hinge, the power control unit controlling whether to execute a first power management status according to whether the first arm contacts the first conductive component as the second module pivots relative to the first module at a first angle by the first hinge;
    a second hinge for pivoting the second module relative to the first module cooperatively with the first hinge; and
    a second arm connected to the second hinge, the power control unit controlling whether to execute a second power management status according to whether the second arm contacts the second conductive component when the second hinge and the first hinge cooperatively pivot the second module relative to the first module at a second angle smaller than the first angle.

2. The electronic device of claim 1, wherein the first arm contacts the first conductive component when the first hinge pivots the second module relative to the first module at the first angle, and the power control unit executes the first power management status when the first arm contacts the first conductive component.

3. The electronic device of claim 1, wherein the first arm does not contact the first conductive component when the first hinge pivots the second module relative to the first module at an angle smaller than the first angle, and the power control unit does not execute the first power management status when the first arm does not contact the first conductive component.

4. The electronic device of claim 1, further comprising an input interface for inputting a first activating signal to the power control unit, the power control unit determining whether to execute the first power management status according to whether the first arm contacts the first conductive component and the first activating signal.

5. The electronic device of claim 1, wherein the first power management status is a power-on/power-off operation.

6. The electronic device of claim 1, wherein the second arm separates from the second conductive component when the first hinge and the second hinge cooperatively pivot the second module relative to the first module at an angle greater than the second angle, and the power control unit executes the second power management status when the second arm separates from the second conductive component.

7. The electronic device of claim 6, wherein the second arm contacts the second conductive component when the first hinge and the second hinge cooperatively pivot the second module relative to the first module at an angle smaller than the second angle, and the power control unit does not execute the second power management status when the second arm contacts the second conductive component.

8. The electronic device of claim 1, further comprising an input interface for inputting a second activating signal to the power control unit, the power control unit determining whether to execute the second power management status according to whether the second arm contacts the second conductive component and the second activating signal.

9. The electronic device of claim 1, wherein the second power management status is a turned-on or a shut-down power status of an initialized system.

10. A power control method, comprising:
    a first hinge of an electronic device pivoting a second module relative to a first module;
    a second hinge and the first hinge of the electronic device cooperatively pivoting the second module relative to the first hinge;
    determining whether a second arm connected to the second hinge contacts a second conductive component of the first module when the first hinge and the second hinge cooperatively pivot the second module relative to the first module at a second angle;

controlling whether the electronic device executes a second power management status according to whether the second arm contacts the second conductive component;
determining whether a first arm connected to the first hinge contacts a first conductive component of the first module when the first hinge pivots the second module relative to the first module at a first angle larger than the second angle; and
controlling whether the electronic device executes a first power management status according to whether the first arm contacts the first conductive component.

11. The power control method of claim 10, wherein the first arm contacts the first conductive component when the first hinge pivots the second module relative to the first module at the first angle, and controlling whether the electronic device executes the first power management status according to whether the first arm contacts the first conductive component comprises the electronic device executing the first power management status when the first arm contacts the first conductive component.

12. The power control method of claim 10, wherein the first arm does not contact the first conductive component when the first hinge pivots the second module relative to the first module at an angle smaller than the first angle, and controlling whether the electronic device executes the first power management status according to whether the first arm contacts the first conductive component comprises the electronic device not executing the first power management status when the first arm does not contact the first conductive component.

13. The power control method of claim 10, further comprising inputting a first activating signal and controlling whether the electronic device executes the first power management status according to whether the first arm contacts the first conductive component and the first activating signal.

14. The power control method of claim 10, wherein the first power management status is a power-on/power-off operation.

15. The power control method of claim 10, wherein the second arm separates from the second conductive component when the first hinge and the second hinge cooperatively pivot the second module relative to the first module at an angle greater than the second angle, and controlling whether the electronic device executes the second power management status according to whether the second arm contacts the second conductive component comprises the electronic device executing the second power management status when the second arm separates from the second conductive component.

16. The power control method of claim 15, wherein the second arm contacts the second conductive component when the first hinge and the second hinge cooperatively pivot the second module relative to the first module at an angle smaller than the second angle, and controlling whether the electronic device executes the second power management status according to whether the second arm contacts the second conductive component comprises the electronic device not executing the second power management status when the second arm contacts the second conductive component.

17. The power control method of claim 10, further comprising inputting a second activating signal and controlling whether the electronic device executes the second power management status according to whether the second arm contacts the second conductive component and the second activating signal.

18. The power control method of claim 10, wherein the second power management status is a power-on/power-off operation.

* * * * *